US011924723B2

(12) United States Patent
Haran

(10) Patent No.: US 11,924,723 B2
(45) Date of Patent: Mar. 5, 2024

(54) SELF-LEARNING SAFETY SIGN FOR TWO-WHEELERS

(71) Applicant: AUTOTALKS LTD., Kfar Netter (IL)

(72) Inventor: Onn Haran, Bnei Dror (IL)

(73) Assignee: AUTOTALKS LTD., Kfar Netter (IL)

( * ) Notice: Subject to any disclaimer, the term of this patent is extended or adjusted under 35 U.S.C. 154(b) by 324 days.

(21) Appl. No.: 17/467,227

(22) Filed: Sep. 5, 2021

(65) Prior Publication Data
US 2022/0074763 A1 Mar. 10, 2022

Related U.S. Application Data

(60) Provisional application No. 63/075,158, filed on Sep. 6, 2020.

(51) Int. Cl.
H04W 4/40 (2018.01)
B60W 50/14 (2020.01)
(Continued)

(52) U.S. Cl.
CPC .............. *H04W 4/40* (2018.02); *B60W 50/14* (2013.01); *G01C 21/3841* (2020.08); *G01C 21/3863* (2020.08); *G01C 21/3896* (2020.08); *G06N 20/00* (2019.01); *G08G 1/164* (2013.01); *G08G 1/166* (2013.01); *H04W 4/12* (2013.01); *B60W 2050/146* (2013.01); *B60W 2554/4026* (2020.02)

(58) Field of Classification Search
CPC .......... H04W 4/40; H04W 4/12; G06N 20/00; G01C 21/3841; G01C 21/3896; G01C 21/3863; B60W 50/14; B60W 2554/4026; B60W 2050/146; G08G 1/164; G08G 1/166; G08G 1/095
See application file for complete search history.

(56) References Cited

U.S. PATENT DOCUMENTS

2006/0162985 A1* 7/2006 Tanaka .................. G08G 1/163
340/436
2017/0236412 A1* 8/2017 Gross .................. G08G 1/0965
701/301
(Continued)

FOREIGN PATENT DOCUMENTS

CN 109591699 A 4/2019
JP 2008269426 A 11/2008
(Continued)

Primary Examiner — Tyler J Lee
Assistant Examiner — Yufeng Zhang
(74) Attorney, Agent, or Firm — Nathan & Associates; Menachem Nathan

(57) ABSTRACT

Embodiments disclosed herein provide for a method including configuring a self-learning safety sign to: establish vehicle-to-everything (V2X) communications with a two-wheeler equipped with a V2X transceiver and positioned at a ride point and/or ridden along a common and divergent route according to a setup stage for the safety sign; receive ride parameters in the V2X communications from the two-wheeler associated with the positioning and/or riding of the two-wheeler; and analyze the received ride parameters to create a ride model for determining a future route to be taken by any two-wheeler in V2X communication with the safety sign.

9 Claims, 5 Drawing Sheets

(51) Int. Cl.
*G01C 21/00* (2006.01)
*G06N 20/00* (2019.01)
*G08G 1/16* (2006.01)
*H04W 4/12* (2009.01)

(56) References Cited

U.S. PATENT DOCUMENTS

2017/0268896 A1* 9/2017 Bai ................... G08G 1/0141
2019/0035276 A1* 1/2019 Zruya ................ G08G 1/166
2019/0371087 A1* 12/2019 Shin .................. G08G 1/0175
2020/0210788 A1* 7/2020 Chinni ............. G06V 30/19147

FOREIGN PATENT DOCUMENTS

| | | |
|---|---|---|
| JP | 2010072839 A | 4/2010 |
| JP | 2011138363 A | 7/2011 |
| WO | 2021226059 A1 | 11/2021 |

* cited by examiner

SELF-LEARNING SAFETY SIGN FOR TWO-WHEELERS

CROSS REFERENCE TO RELATED APPLICATIONS

This application claims priority from U.S. Provisional Patent Application No. 63/075,158 filed on Sep. 6, 2020, which is expressly incorporated herein by reference in its entirety.

FIELD

Embodiments disclosed herein relate generally to a self-learning safety sign for two-wheelers, and in particular to prediction of the route of a two-wheeler approaching an intersection for alerting drivers of the impending presence of the two-wheeler.

BACKGROUND

Vehicle-to-everything (V2X) communications can prevent accidents in intersections by alerting a driver of a vehicle when another vehicle (or more generally a "road-user", including two-wheelers and pedestrians) enters its driving path.

Two-wheeler usage in cities is growing, and there is an associated increase in accidents involving two-wheelers. As used herein, "two-wheeler" may refer to any of a bicycle, kick scooter, electric bike, electric scooter, personal transporter, hover-board, or similar vehicle that may have in practice any number of wheels. Users of such two-wheelers are referred to herein as "riders". Scooter riders are the most prone to accidents, since scooter stability is lower because of the small wheels.

The vast majority of two-wheeler accidents happen at intersections. To accommodate two-wheelers, many cities include bike lanes. The greatest fear of two-wheeler riders (in left-hand drive countries) is continuing straight when a car turns right across the bike lane, failing to notice them.

One approach for reducing accidents is a dynamic safety sign that can be installed at the intersection alerting a driver when a two-wheeler riding in the bike lane on the right is continuing straight. It should be appreciated that drivers are affected by false alarms, and misleading sign will be ignored when encountered again in the future. For example, a rider may turn right into another bike lane, and in this case, no alert should be raised. Solutions for dynamic two-wheeler safety are described such as in co-owned U.S. patent application Ser. No. 17/246,617 filed on May 1, 2021 that defines a map-based method for configuration.

There is therefore a need for, and it would be advantageous to have, a safety sign with simplified methods of configuration capable of determining the path of a rider and alerting drivers.

SUMMARY

Embodiments disclosed herein provide for a self-learning safety sign. The safety sign uses machine learning techniques to configure itself based on a simplified initial setup and the actual routes of passing two-wheelers in order to predict their future paths and then provide warnings to passing vehicles. The term "self-learning" as used herein refers to this described functionality that enables the sign to be trained and continue improving a ride model for predicting two-wheeler routes based on actual routes of passing two-wheelers. The self-learning safety sign is referred to herein and exemplarily as "V2Sign". A V2Sign can be placed adjacent to or on existing road-sign poles in signalized and non-signalized intersections. The V2Sign may be positioned so as to be observed by drivers of vehicles approaching an intersection, visually alerting drivers when V2X-connected two-wheelers are about to enter an intersection.

The disclosed device and processes may reliably protect two-wheelers in a "smart intersection". The described devices and methods provide for alerts for all vehicles (and their drivers), even those without V2X devices. In some embodiments, drivers of vehicles without V2X devices may receive a visual alert on the V2Sign, warning of an approaching two-wheeler. The devices and methods described herein may dramatically lower the cost of implementing a smart intersection to thereby increase the protection of two-wheelers from accidents.

In various embodiments there is provided a method, comprising: configuring a self-learning safety sign to establish V2X communications with a two-wheeler equipped with a V2X transceiver and positioned at a ride point and/or ridden along a common and divergent route according to a setup stage for the safety sign; receive ride parameters in the V2X communications from the two-wheeler associated with the positioning and/or riding of the two-wheeler; and analyze the received ride parameters to create a ride model for determining a future route to be taken by any two-wheeler in V2X communication with the safety sign. In some embodiments, the ride point is a position proximal to a crosswalk on the common route.

In some embodiments, the safety sign is further configured to communicate with a setup app configured for indicating a setup stage. In some embodiments, the safety sign is further configured to: determine comparison parameters including comparison points and associated ride parameters; form a decision parameter table including comparison parameters featuring ride parameters with considerable differences at a comparison point; and based on the decision parameter table, train a decision algorithm to create the ride model. In some embodiments, the ride model is created using machine learning techniques.

In various embodiments, there is provided a method for determining a probable future route to be taken by a two-wheeler, comprising: providing a vehicle communication device configured for establishing V2X communications with the two-wheeler, wherein the two-wheeler transmits ride parameters as part of the V2X communication; and providing a controller operating a decision algorithm, the decision algorithm including a ride model and configured to predict, based on the ride parameters and a ride model, future ride parameters of the two-wheeler, and to analyze an actual route taken by the two-wheeler and the predicted future ride parameters to determine a probable future route to be taken by the two-wheeler.

In some embodiments, the future ride parameters include a confidence level. In some embodiments, the decision algorithm is further configured to update the future ride parameters, actual route, and probable future route each time a V2X message is received from the two-wheeler. In some embodiments, the method further includes providing a display configured to provide a visual alert when the probable future route crosses a vehicle path. In some embodiments, the decision algorithm is further configured to retrain using machine learning techniques based on ride parameters of an actual route taken by the two-wheeler to thereby improve the ride model.

In various embodiments, there is provided a self-learning safety sign, comprising: a vehicular communication device configured for V2X communications with a V2X transceiver of a two-wheeler, wherein the V2X communications include ride parameters of the two-wheeler; and a decision algorithm configured to determine a probable future path of the two-wheeler based on the communicated ride parameters and on a ride model. In some embodiments, the sign is further configured for interaction with a setup app for defining stages of a setup process of the sign to create the ride model.

In some embodiments, the setup app runs on a mobile device or on a controller of a setup two-wheeler. In some embodiments, the sign further includes a display configured for visually alerting a driver of a vehicle at an intersection when the sign has determined that the two-wheeler is on a route that may cross the path of the vehicle. In some embodiments, the decision algorithm is configured to create the ride model by: receiving ride parameters transmitted by a two-wheeler when the two-wheeler is positioned at a ride point and/or ridden along a common and divergent route; and analyzing the received ride parameters to create a ride model for predicting a route to be taken by any two-wheeler in V2X communication with the sign.

In some embodiments, the ride point is a position proximal to a crosswalk on the common route. In some embodiments, the analyzing the received ride parameters to create a ride model includes: determining comparison parameters including comparison points and associated ride parameters; forming a decision parameter table including comparison parameters featuring ride parameters with considerable differences at a comparison point; and based on the decision parameter table, training a decision algorithm to create the ride model. In some embodiments, the decision algorithm is configured to create the ride model using machine learning techniques.

This Summary is provided to introduce a selection of concepts in a simplified form that are further described below in the Detailed Description below. It may be understood that this Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein and should not be considered limiting in any way. Like elements in different drawings may be indicated by like numerals. Elements in the drawings are not necessarily drawn to scale.

DETAILED DESCRIPTION

Embodiments disclosed herein provide for a self-learning V2Sign. The V2Sign may configure itself based on routes of approaching two-wheelers and may predict their future routes. The V2Sign initial configuration (also referred to herein as "setup") as described herein may be simple enough to be performed by a non-technologically savvy installer, using for example a two-wheeler with a V2X device in technician mode or a smartphone application.

Figure 1A:
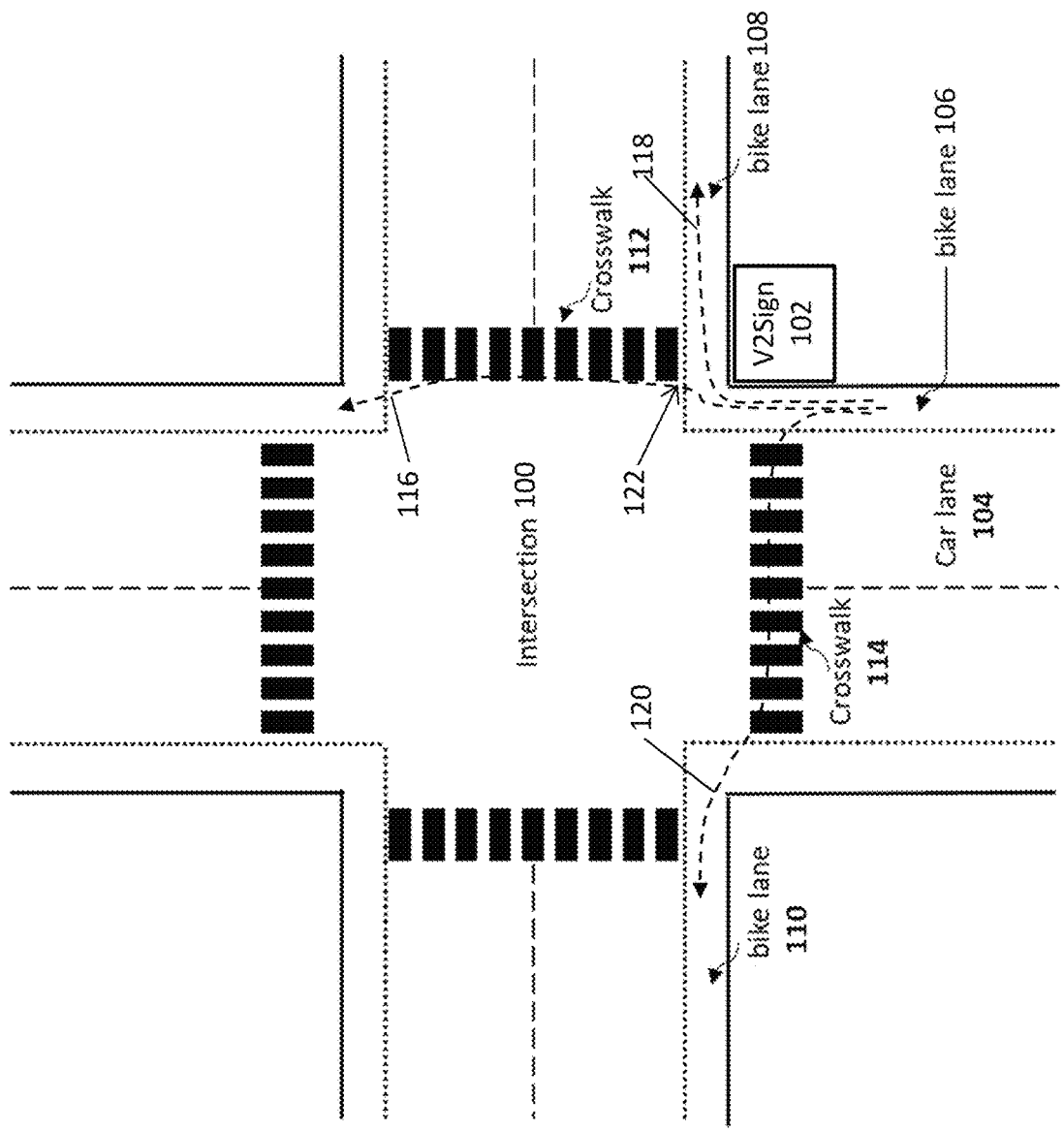
FIG. 1A illustrates an intersection with a V2Sign according to some embodiments.

FIG. 1A illustrates an intersection 100 with a V2Sign 102 according to some implementations. V2Sign 102 may be used with any intersection geometry, with any number of connecting roads, even a roundabout. The examples disclosed herein relate to one instance of a left-hand drive road system and it should be appreciated that the disclosed systems and methods may be adapted for other intersection geometries and right-hand drive road systems.

FIG. 1A exemplarily illustrates a four-way stop intersection 100 with a V2Sign 102, for alerting a driver arriving in car lane 104 of a crossing two-wheeler. Intersection 100 includes crosswalks 114 running perpendicular and across car lane 104 and 112 running parallel to car lane 104 and across an adjacent substantially perpendicular intersecting road. Intersection 100 further includes the following bike lanes: a bike lane 106 running substantially parallel to car lane 104 where two-wheelers may continue straight in a direction shown by arrow 116; a bike lane 108 running adjacent and substantially perpendicular to car lane 104 where two-wheelers may turn right from lane 106 in a direction shown by arrow 118; and a bike lane 110 running substantially perpendicular to car lane 104 in an opposite direction to lane 108 where two-wheelers may turn left in a direction shown by arrow 120. In use, V2Sign 102 may only alert drivers in car lane 104 of two-wheelers continuing straight (arrow 116) across crosswalk 112 or left (arrow 120) across crosswalk 114.

Figure 1B:
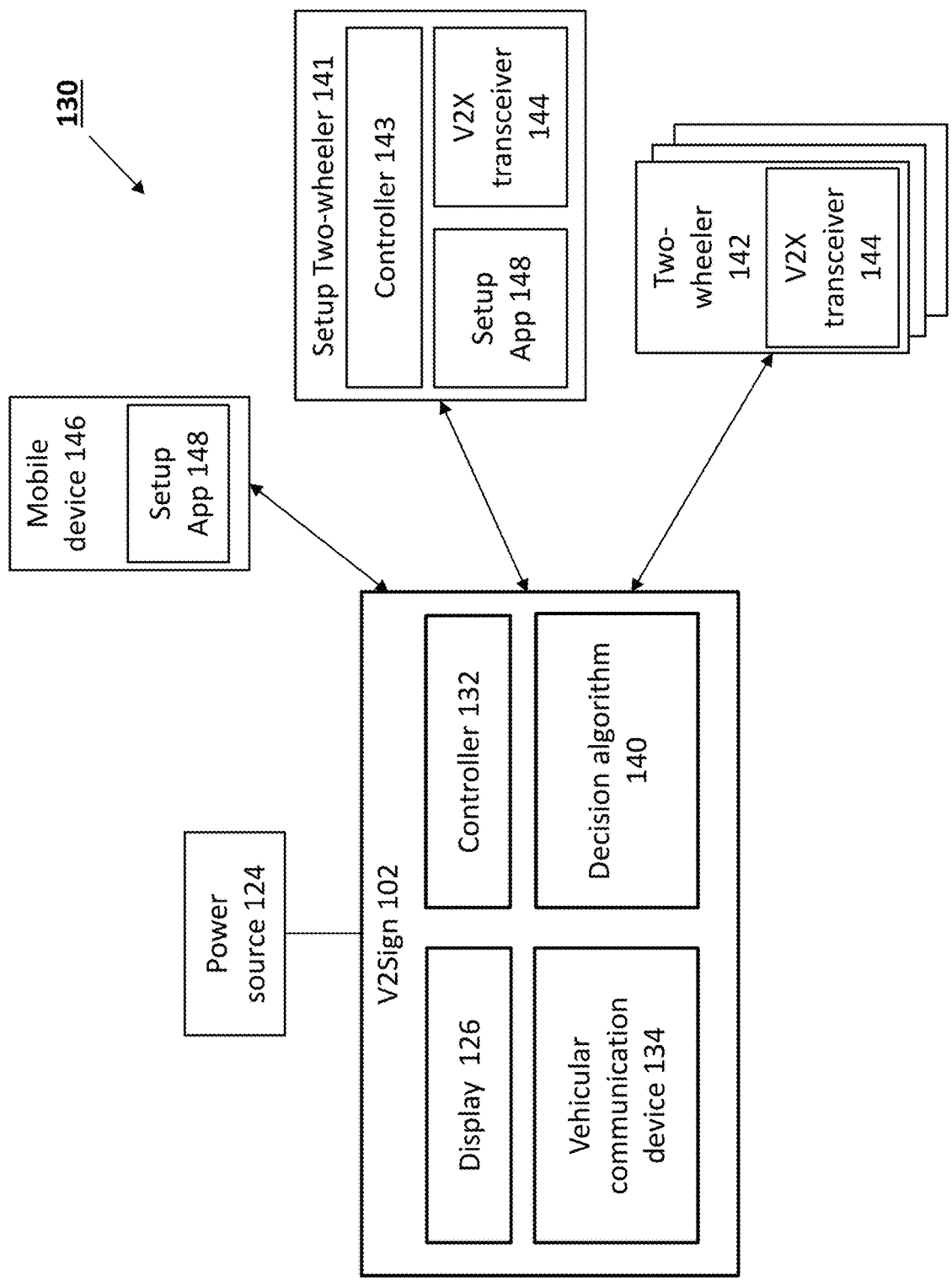
FIG. 1B illustrates schematically in a block diagram components of a V2Sign system according to some embodiments.

FIG. 1B illustrates schematically in a block diagram components of a V2Sign system 130 according to some implementations. V2Sign 102 is a computing device as defined herein.

V2Sign 102 may include a controller 132. Controller 132 may manage the operation of the components of V2Sign 102 and may direct the flow of data between the components of V2Sign 102. Where V2Sign 102 may be said herein to provide specific functionality or perform actions or processes, it should be understood that the functionality or actions are performed by controller 132 that may call on other components of V2Sign 102. V2Sign 102 components such as hardware and software modules may include a vehicular communication device 134, a decision algorithm 140, and a display 126. In some embodiments, display 126 includes light sources or any form of a visual signal for visually alerting a driver of a vehicle at an intersection when V2Sign 102 has determined that a two-wheeler is on a route that may cross the path of the vehicle.

As shown in FIG. 1B, V2Sign system 130 may include a "setup" two-wheeler 141 for use as part of a setup process 200 (FIG. 2A) described below. Setup two-wheeler 141 may include a controller 143 that may manage the operation of setup two-wheeler 141 and may direct the flow of data between the components of setup two-wheeler 141. Setup two-wheeler 141 may include a V2X transceiver 144 supporting V2X communication with other V2X enabled devices such as V2Sign 102. System 130 may include multiple two-wheelers 142, where each two-wheeler 142 may include a V2X transceiver 144 and a controller (not shown). Two-wheelers 141 and 142 may use intersection 100 and thus may be in communication with V2Sign 102. Setup two-wheeler 141 may be the same as one of two-wheelers 142 but may include a technician mode in controller 143 enabling operation of setup app 148 running on controller 143.

A vehicular communication device 134 connects V2Sign 102 with V2X transceivers 144 installed on two-wheelers 142. A single two-wheeler 142 is shown for simplicity, but it should be appreciated that system 130 may include multiple two-wheelers 142 simultaneously communicating (using V2X transceivers 144) with V2Sign 102. V2X transceiver 144 and communication device 134 may use IEEE802.11p or 3GPP C-V2X PC5 standards for communication.

In use and as described below, as part of setup process 200 or an operation process 300 (see below), the ride parameters in received V2X messages from two-wheelers 141 and 142 are analyzed by V2sign 102 as part of the route learning process to determine the most probable future path of a two-wheeler 142 that is in communication with V2Sign 102. It should be appreciated that the setup process may be performed on (or using) a given (particular) two-wheeler 141 or 142, while the determination of the future path may be for the given two-wheeler 141 or 142 or for any other two-wheeler 142 in communication with the V2Sign.

V2Sign 102 is powered by a power source 124 and may be mounted on a sign pole (not shown). System 130 may also include a setup app 148 that is a software application running on a mobile device 146 such as a smartphone, or running on a controller 143 of a setup two-wheeler 141. Setup app 148 may operate using the hardware and software components of mobile device 146 or controller 143 such as human interface components (display, touch surface), GPS, and so forth.

Figure 2A:
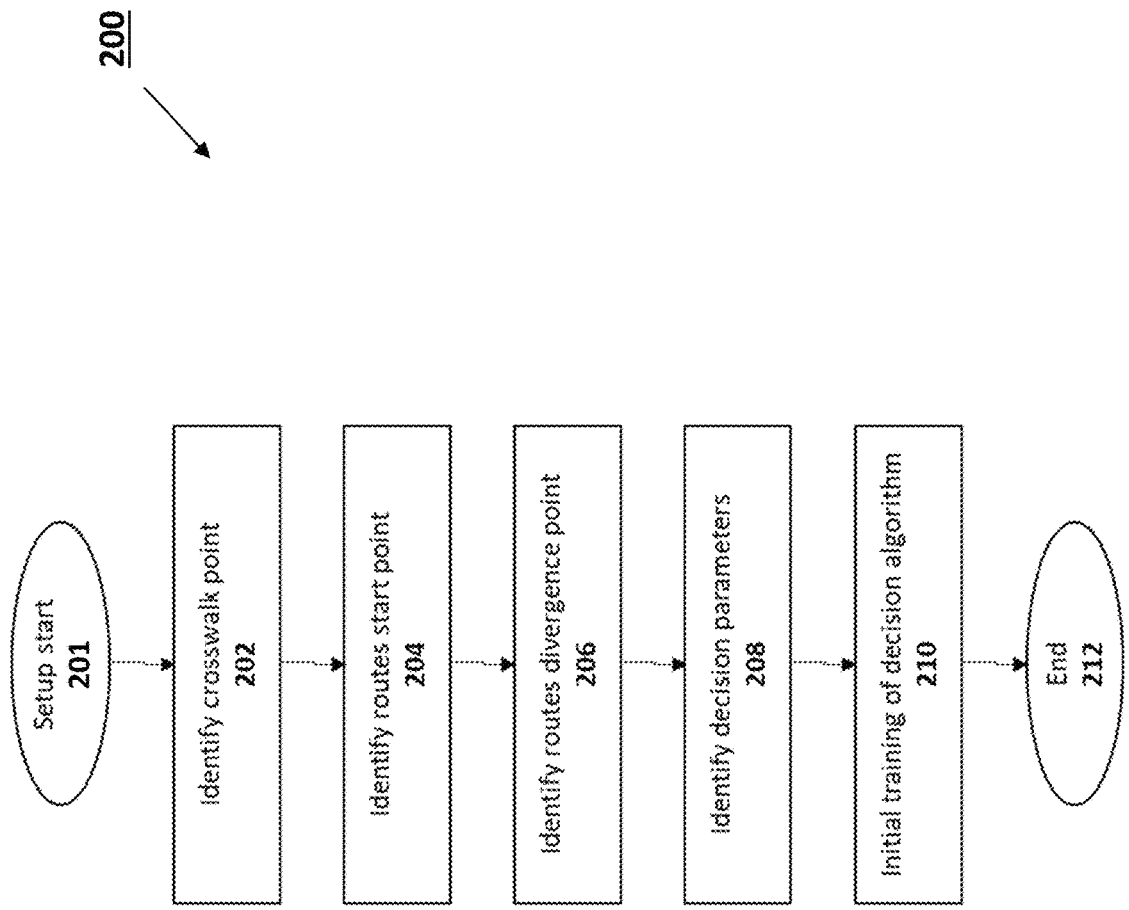
FIG. 2A illustrates a flow chart of a process for setting up a V2Sign according to some embodiments.
Figure 2B:
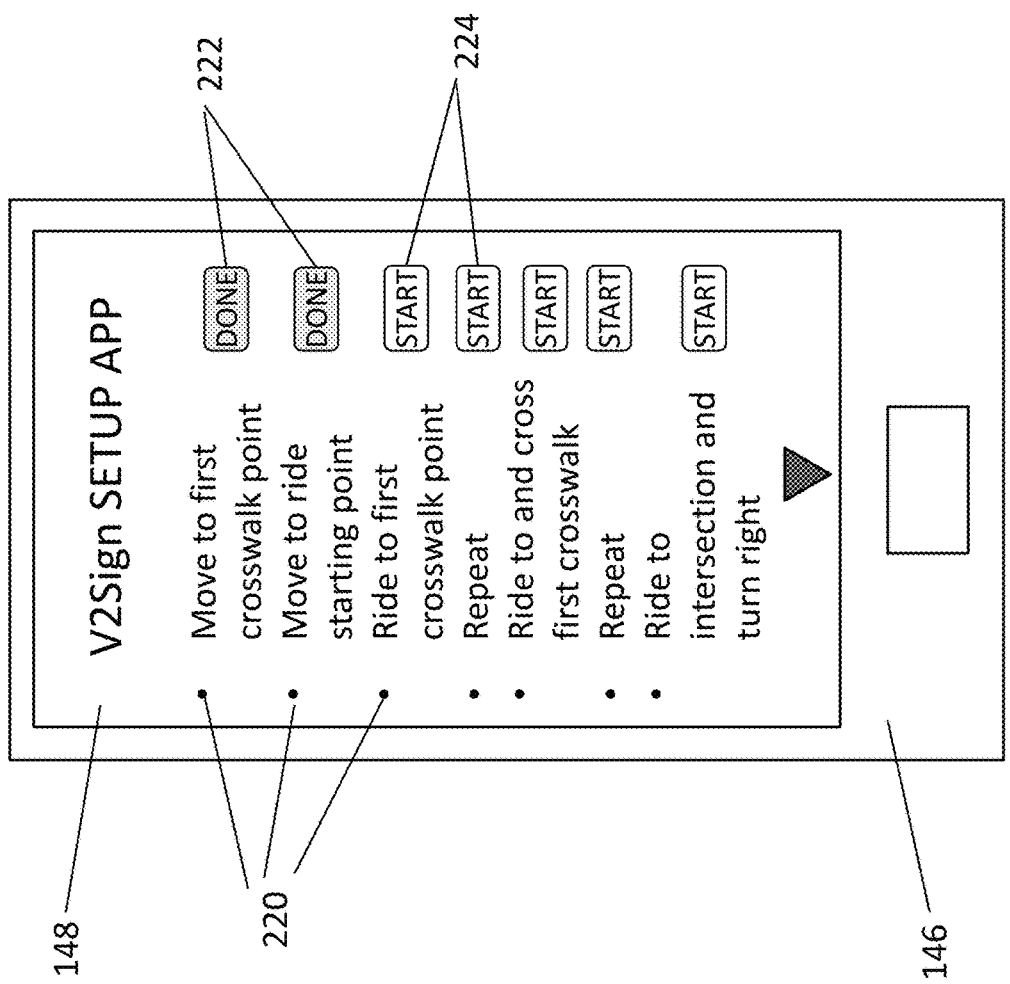
FIG. 2B is an exemplary GUI of a setup app used as part of a V2Sign setup process according to some embodiments.

FIG. 2A illustrates a flow chart of a process 200 for setting up a V2Sign 102 according to some embodiments. FIG. 2B is an exemplary graphical user interface (GUI) of a setup app 148 used as part of process 200 according to some embodiments. In some embodiments, process 200 may be controlled by an installer using a mobile device 146 (FIG. 4) running a dedicated setup app 148 (FIG. 1B) as well as a two-wheeler 142 including a V2X transceiver 144 ridden by the installer or another rider. In some embodiments, process 200 may be controlled by an installer using a setup two-wheeler 141 running a V2X transceiver 144 and a controller 143 configured for operation of setup app 148, where setup two-wheeler 141 is ridden by the installer or another rider. In process 200, the stage of the setup may be indicated in setup app 148 that may indicate the setup stage to V2Sign 102 enabling V2Sign 102 to associate received ride parameters with the chosen setup stage, and the corresponding route or position data and other ride parameters are provided by V2X transceiver 144 on two-wheelers 141 or 142.

As shown in the exemplary GUI of setup app 148 of FIG. 2A, several setup stages 220 are listed. An installer may process a setup stage 220 by selecting a "start" button 224 and then performing the associated action using the two-wheeler 141 or 142. Upon completion of a setup stage 220 (such as when the associated action has been completed), an indication of setup stage completion may be provided such as by selecting a "done" indication 222. Stages may include positioning of two-wheeler 141 or 142 at specific ride points and/or riding two-wheeler 141 or 142 along common and divergent (non-straight) routes. In some embodiments, the stage selected for processing is communicated to V2Sign 102 by setup app 148.

Process 200 begins at step 201 where setup starts. Initially V2Sign 102 is powered on such as by connection to a power source 414 (FIG. 4). A secure control link is then established between app 148 and the V2Sign to be setup and V2X communications are established between two-wheeler 141 or 142 and the V2Sign to be setup. In some embodiments, V2Sign 102 requires mounting in position (such as on a sign pole) before process 200 can begin. V2Sign 102 is positioned so as to be observed by drivers of vehicles approaching an intersection where the vehicle path may cross the route taken by a two-wheeler 102.

Next, at step 202, a first crosswalk point is identified such as by positioning setup two-wheeler 142 at the beginning of the first crosswalk point in the middle of the bike lane, such as at point 122 at the junction of bike lane 106 and the beginning of crosswalk 112 in response to a prompt indicating this setup stage on app 148. The V2X messages from the setup two-wheeler 142 including ride parameters (such as but not limited to GPS readings) are captured by V2Sign 102 and fed into, for example, a Kalman filter until the filter converges.

Next, at step 204, a ride start point of the potential routes that a rider might take is identified such as by moving the setup two-wheeler 142 to a ride start point in response to a prompt for the setup stage 220 on app 148. In some embodiments, the setup two-wheeler 142 is positioned on the bike lane 106 parallel to the car lane (where V2Sign 102 is installed) N meters from the first crosswalk point to define the ride start point. In some embodiments, N=40. Then, an initial straight or "common route", such as route 116, is ridden (after selecting the relevant setup stage 220 in app 148). In some embodiments, the common route ride is repeated twice or more where the two-wheeler 141 or 142 rides from the ride start point and stops at the first crosswalk point 122. Then the full straight route is ridden two times or more in which the two-wheeler 141 or 142 continues across crosswalk 112 to cross the street to complete route 116. During these rides, V2X transceiver 144 of two-wheeler 141 or 142 transmits to V2Sign 102 multiple two-wheeler ride parameters for each ride using V2X messages, where the parameters include but are not limited to: location, speed, heading, yaw rate, and acceleration. The received ride parameters are recorded by V2Sign 102. For the recorded paths/routes, the common start point (as opposed to the ride start point) for purposes of calculation and comparison may be set arbitrarily as M meters before the identified crosswalk point 122. For example, M=30. Each of the recorded ride parameters may be averaged at substantially the same distances from the crosswalk point 122. For example, all speed values from all rides at substantially 15 m from point 122 are averaged (as well as at substantially 14 m and substantially 13 m and so forth). Similarly, averaging may be performed at each distance for heading, yaw rate, acceleration, and other ride parameters.

Next, at step 206, the route divergence points are analyzed by V2Sign 102. The goal of step 206 is to limit the parameter monitoring performed on the routes and to focus the parameter monitoring only where changes are expected. In step 206 the procedure of ride recording (as described above in step 204) is repeated multiple times for each of the divergent routes starting at the ride start point: turning right such as toward lane 108, and turning left such as toward crosswalk 114, where the turning left route is divided into two cases, stopping before the second crosswalk, such as crosswalk 114 and continuing across the second crosswalk. Ride parameters for these divergent routes as received from setup two-wheeler 142 are recorded by V2Sign 102 for each of the rides of step 206 as in step 204. If a route doesn't exist, for example, no right turn, then, in some embodiments, the installer may indicate this on setup app 148 for notifying V2Sign 102.

V2Sign 102 then performs an analysis of the ride parameters recorded in steps 204 and 206 to determine where the non-straight routes (and straight routes that cross the crosswalk 112) diverge from the common (straight) routes, with comparisons made at comparison points spaced a fixed distance apart, exemplarily every 1 m. At each comparison point, the ride parameters of the common routes may be compared with ride parameters from all other routes. If a considerable difference (such as but not limited to 5-10%) is detected in any of the ride parameters at a comparison point, such as but not limited to >1 m/s acceleration difference, >5° heading difference, or >1 m lateral distance difference, then the comparison point and related ride parameters (herein referred to as "comparison parameters") may be used in step 208 by V2Sign 102 to form a decision parameter table. The comparison continues until ride parameter divergence is found for all routes and the decision parameter table is completed.

The efficiency of the algorithm deciding the most probable route taken by the rider depends on the number of comparison parameters that need to be monitored, so the fewer comparison parameters the better. Therefore, only comparison parameters that differ between the different routes are monitored while taking into account potential positioning errors that might cause the comparison points to diverge slightly. An exemplary decision parameter table is shown in Table 1.

TABLE 1

| Comparison point | Parameter #1 | Parameter #2 | ... | Parameter #N |
|---|---|---|---|---|
| Common route start | Ignore | Monitor | | Ignore |
| Common route start + 1 | Monitor | Monitor | | Ignore |
| ... | | | | |
| Common end − 1 | Monitor | Monitor | Monitor | Monitor |
| Common route end | Monitor | Monitor | Monitor | Monitor |

Next, at step 210, the decision algorithm 140 is initially trained in V2Sign 102 using machine learning techniques. The initial learning phase uses the decision parameter table to train decision algorithm 140 to create a ride model that may be used to predict the route taken by a two-wheeler based on ride parameters received from that two-wheeler. Multiple algorithms, known in the literature, may be applied to train decision algorithm 140 including but not limited to neural network (NN) algorithms, or a Bayesian network algorithm that can calculate the most likely route, for example an Approximate Bayesian computation (ABC) algorithm. The selected training algorithm depends on the capabilities of the processor (not shown) in V2Sign 102 running the training algorithm. In some embodiments, where the processor includes NN accelerators, then NN based training algorithms may be used. The weights for either algorithm may be selected based on known art. Setup process 200 ends at step 212. At the end of process 200, V2Sign 102 may be activated for operational use.

Figure 3:
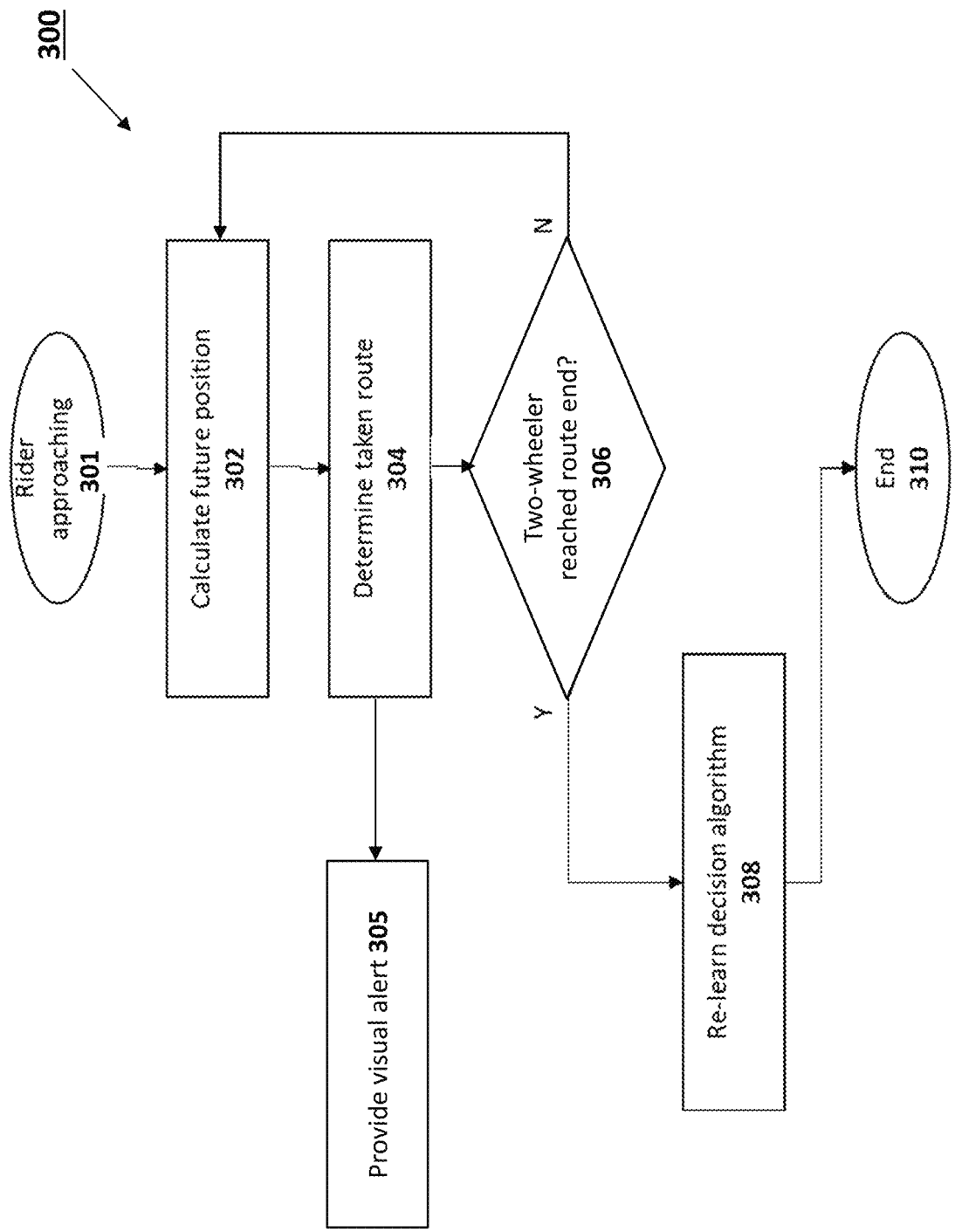
FIG. 3 illustrates a flow chart of a process for V2Sign operation according to some embodiments.

FIG. 3 illustrates a flow chart of a process 300 for V2Sign 102 operation according to some embodiments. Process 300 takes place after setup (process 200) has been performed for the V2Sign 102. Process 300 begins at step 301 upon approach and initiation of a V2X connection, such as between vehicle communication device 134 and V2X transceiver 144 of any two-wheeler 142. The approaching two-wheeler 142 thus uses V2X protocols to communicate ride parameters of two-wheeler 142 to V2Sign 102.

Next, at step 302, predicted future ride parameters of two-wheeler 142 are determined by V2Sign 102 (such as by decision algorithm 140) based on received ride parameters. The ride model (created in process 200), is applied, for example, using a Kalman filter, to predict future ride parameters (including a confidence level) such as but not limited to the future speed, heading, and location of the two-wheeler based on ride parameters provided by two-wheeler 142.

Next, at step 304, the decision algorithm 140 determines the actual route taken by the two-wheeler based on the ride parameters provided by the two-wheeler. As part of step 304, it may be determined that the two-wheeler is on a route that is unknown and process 300 ends. Decision algorithm 140 analyzes the actual route, future predicted ride parameters, and the determined confidence levels to then determine the most probable future route that the two-wheeler appears to be taking. It should be appreciated that the confidence level of predicted ride parameters decreases as the prediction time extends into the future. For example, the predicted location 0.1 sec ahead is quite certain, but the location 2 sec ahead might change based on future rider actions.

Steps 302 and 304 are repeated for every received V2X message from the two-wheeler until the probable future route has been determined with sufficient confidence and a route decision can then be provided by decision algorithm 140. In some embodiments, a confidence level of more than 80% may be sufficient for a route decision.

When it is determined that the probable future route of the two-wheeler will cross the path of a vehicle, then in step 305, V2Sign 102 may provide a visual alert, warning the vehicle of the approaching two-wheeler.

Next, at step 306, a check is made as to whether the two-wheeler has completed one of the known routes. If not, then process 300 returns to step 302 and 304 for processing of the subsequent V2X message from the two-wheeler. If the two-wheeler has completed a known route, then process 300 continues from step 308, where decision algorithm 140 is retrained to improve the decision parameters and the ride model. At this stage, the actual route that the two-wheeler 142 took is known. The actual route is recorded by V2Sign 102, and the ride parameters are fed back into decision algorithm 140, applying a supervised machine learning scheme (such as in step 210). In this way, each passing two-wheeler 142 improves the quality of the ride model in decision algorithm 140. Process 300 ends at step 310.

In some embodiments, in step 308, historical route analysis is performed for a two-wheeler that was monitored by V2Sign 102 in order to adjust the determination of confidence levels for future route predictions. In historical route analysis future route predictions for the two-wheeler that were made in the preceding time periods may be compared with the actual route taken by the two-wheeler at those previous time periods to thereby assess the accuracy of the (previous) future route predictions. If the previous predictions were substantially accurate then the decision parameters that were used to determine the confidence levels may be given more weight (and vice versa).

Unless otherwise defined, all technical and scientific terms used herein have the same meaning as commonly understood by one of ordinary skill in the art. The materials, methods, and examples provided herein are illustrative only and not intended to be limiting.

As used herein the terms "machine learning" or "artificial intelligence" or "neural networks" have the meaning as known in the art and may refer to use of algorithms on a computing device that parse data, learn from the data, and then make a determination or generate data, where the determination or generated data is not deterministically replicable (such as with deterministically oriented software as known in the art).

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a processor chip or a circuit. As software or algorithm, selected steps of the disclosure could be implemented as a plurality of software instructions being executed by a computer/processor using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

It should be appreciated that the above-described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
configuring a self-learning safety sign to:
   establish vehicle-to-everything (V2X) communications with a two-wheeler equipped with a V2X transceiver and positioned at a ride point and/or ridden along a common and divergent route according to a setup stage for the safety sign;
   receive ride parameters in the V2X communications from the two-wheeler associated with the positioning and/or riding of the two-wheeler; and
   analyze the received ride parameters to create a ride model for determining a future route to be taken by any two-wheeler in V2X communication with the safety sign,
   wherein the configuration to analyze the received ride parameters to create a ride model includes a configuration to determine comparison parameters including comparison points and associated ride parameters, form a decision parameter table including comparison parameters featuring ride parameters with considerable differences at a comparison point, and based on the decision parameter table, train a decision algorithm to create the ride model.

2. The method of claim 1, wherein the ride point is a position proximal to a crosswalk on the common route.

3. The method of claim 2, wherein the safety sign is further configured to communicate with a setup app configured for indicating a setup stage.

4. The method of claim 1, wherein the ride model is created using machine learning techniques.

5. A self-learning safety sign comprising:
a vehicular communication device configured for vehicle-to-everything (V2X) communications with a V2X transceiver of a two-wheeler; and
a decision algorithm configured to determine a probable future path of the two-wheeler based on the communicated ride parameters and on a ride model by:
   receiving ride parameters transmitted by the two-wheeler when the two-wheeler is positioned at a ride point and/or ridden along a common and divergent route, wherein the ride point is a position proximal to a crosswalk on the common route; and
   analyzing the received ride parameters to create a ride model for predicting a route to be taken by the two-wheeler by determining comparison parameters including comparison points and associated ride parameters, forming a decision parameter table including comparison parameters featuring ride parameters with considerable differences at a comparison point, and based on the decision parameter table, training a decision algorithm to create the ride model.

6. The self-learning safety sign of claim 5, further configured for interaction with a setup app for defining stages of a setup process of the sign to create the ride model.

7. The self-learning safety sign of claim 6, wherein the setup app runs on a mobile device or on a controller of a setup two-wheeler.

8. The self-learning safety sign of claim 5, further comprising a display configured for visually alerting a driver of a vehicle at an intersection when the sign has determined that the two-wheeler is on a route that may cross the path of the vehicle.

9. The self-learning safety sign of claim 5, wherein the decision algorithm is configured to create the ride model using machine learning techniques.

* * * * *